US008233074B2

(12) United States Patent
Nishikawa et al.

(10) Patent No.: US 8,233,074 B2
(45) Date of Patent: Jul. 31, 2012

(54) LENS UNIT AND IMAGING DEVICE

(75) Inventors: Masayuki Nishikawa, Higashiosaka (JP); Hideaki Fujita, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 473 days.

(21) Appl. No.: 12/310,408

(22) PCT Filed: Aug. 24, 2007

(86) PCT No.: PCT/JP2007/066464
§ 371 (c)(1),
(2), (4) Date: Sep. 11, 2009

(87) PCT Pub. No.: WO2008/023798
PCT Pub. Date: Feb. 28, 2008

(65) Prior Publication Data
US 2011/0050987 A1 Mar. 3, 2011

(30) Foreign Application Priority Data

Aug. 24, 2006 (JP) ................ P2006-227666
Nov. 30, 2006 (JP) ................ P2006-324042

(51) Int. Cl.
*H04N 5/225* (2006.01)
(52) U.S. Cl. .................................... 348/340
(58) Field of Classification Search .......... 359/366, 359/646, 703, 704, 811, 813; 396/144
See application file for complete search history.

(56) References Cited

U.S. PATENT DOCUMENTS

| 5,150,260 | A  | * | 9/1992  | Chigira .................... 359/694 |
| 5,231,473 | A  | * | 7/1993  | Kawamura et al. ........... 359/694 |
| 5,361,168 | A  | * | 11/1994 | Arai et al. .................. 359/796 |
| 5,712,734 | A  |   | 1/1998  | Kanno |
| 6,453,123 | B1 | * | 9/2002  | Oshima ..................... 396/79 |
| 7,057,829 | B2 | * | 6/2006  | Tanigawa et al. ............ 359/704 |
| 7,099,093 | B2 | * | 8/2006  | Jeong et al. ................. 359/823 |
| 7,321,726 | B2 | * | 1/2008  | Uemura et al. .............. 396/72 |

(Continued)

FOREIGN PATENT DOCUMENTS

| JP | 04-328705 A    |   | 11/1992 |
| JP | 08-136791 A    |   | 5/1996  |
| JP | 09-203844 A    |   | 8/1997  |
| JP | 2003-270509 A  |   | 9/2003  |
| JP | 2006-106230 A  |   | 4/2006  |
| JP | 2006-195052 A  |   | 7/2006  |
| JP | 2006-195053 A  |   | 7/2006  |
| JP | 2006195053 A   | * | 7/2006  |

OTHER PUBLICATIONS

JP-2006195053-A—Translation—Machine Translation of JP-2006195053-A.*

*Primary Examiner* — Sinh Tran
*Assistant Examiner* — Jason Flohre
(74) *Attorney, Agent, or Firm* — Edwards Wildman Palmer LLP; David G. Conlin; David A. Tucker

(57) ABSTRACT

A lens unit having a first lens (2) whose optical surface on the imaging surface side is made of resin (32), a first lens holder (3) for holding the first lens (2), a second lens (6) placed to the imaging side of and spaced in the optical axis direction from the first lens (2), and a second lens holder (4) for holding the second lens (6). The first lens (2) and the second lens (6) are movable relative to each other. A second lens holder recess (8) which a resin projection (33) of the first lens (2) can enter and exit from is formed in the second lens holder (4).

2 Claims, 10 Drawing Sheets

U.S. PATENT DOCUMENTS

| | | | |
|---|---|---|---|
| 7,330,648 B2 * | 2/2008 | Morinaga et al. | 396/144 |
| 7,356,252 B2 * | 4/2008 | Wang | 396/79 |
| 7,443,620 B2 * | 10/2008 | Mitani et al. | 359/822 |
| 7,848,638 B2 * | 12/2010 | Senba | 348/373 |
| 2001/0033360 A1 * | 10/2001 | Koizumi et al. | 351/159 |
| 2005/0168847 A1 * | 8/2005 | Sasaki | 359/823 |
| 2005/0231818 A1 * | 10/2005 | Matsusaka | 359/680 |
| 2006/0013577 A1 * | 1/2006 | Uemura et al. | 396/79 |
| 2006/0139776 A1 * | 6/2006 | Mori | 359/819 |
| 2007/0201152 A1 * | 8/2007 | Nishikawa et al. | 359/819 |
| 2007/0229702 A1 * | 10/2007 | Shirono et al. | 348/374 |

* cited by examiner

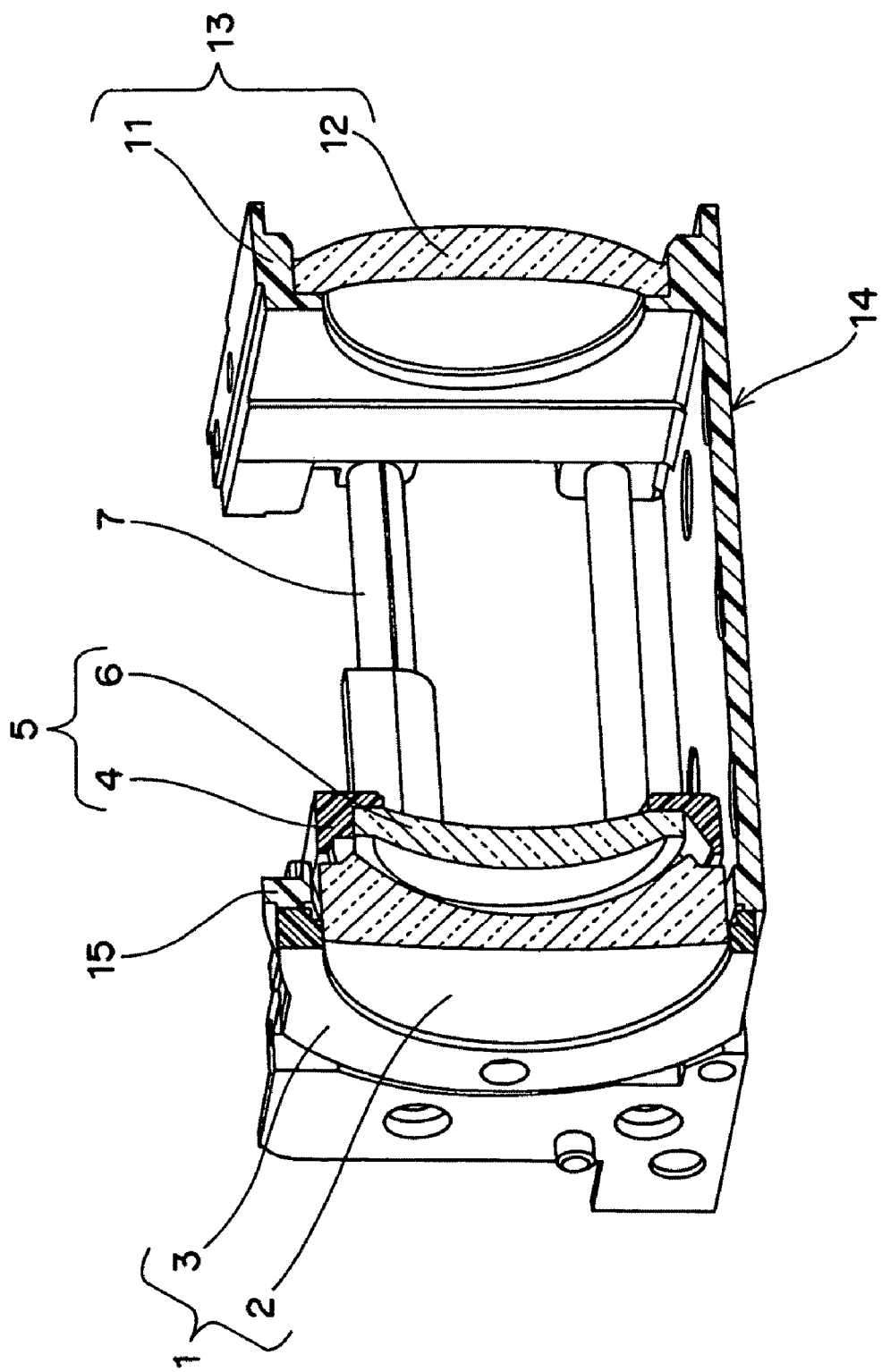

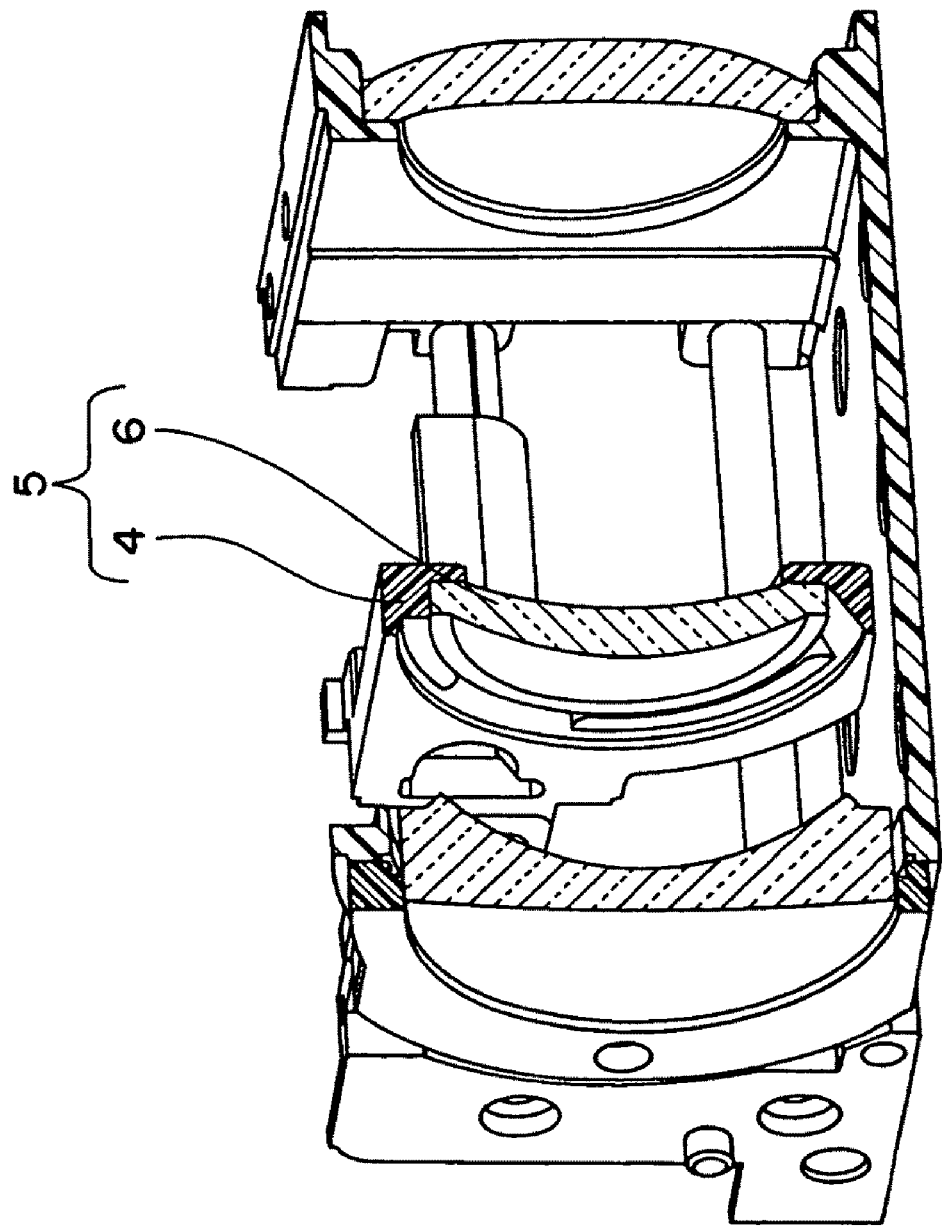

LENS UNIT AND IMAGING DEVICE

TECHNICAL FIELD

The present invention relates to a lens unit and an imaging device and in particular to a small lens unit and an imaging device using the lens unit.

BACKGROUND ART

A conventional lens unit has a zoom function of driving two or more lens groups in the direction of an optical axis, as shown in FIG. 8 (see JP 2003-270509 A, for example). In FIG. 8, an imaging element is in the positive direction of the Z-axis, and a subject is in the negative direction of the Z-axis.

The lens unit having a zoom function shown in FIG. 8 has a first lens holder 51 holding a first lens group 50 and a second lens holder 53 holding a second lens group 52. The first lens holder 51 is guided in the direction of the optical axis (Z-axis) along a first guide shaft 54. The second lens holder 53 is guided in the direction of the optical axis along a second guide shaft 55. In this way, the first and second lens holders 51 and 53 can be moved in the direction of the optical axis along the first and second guide shafts 54 and 55, respectively. The first and second lens holders 51 and 53 are provided with a driving means (not shown) and can be moved in the direction of the optical axis. The first lens holder 51 and the second lens holder 53 are movable relative to each other and may therefore approach each other.

However, the lens unit having the zoom function has the following problems. A space is needed to avoid contact between the lens holders when the lens holders approach each other. Thus, it is difficult to shorten the lens unit, and the optical design needs to take it into consideration to provide this space.

Furthermore, another conventional lens unit uses a so-called hybrid lens with resin glued to a surface of it. This hybrid lens is used to increase the flexibility of an optical design and enables a design to reduce an optical total length. Thus, the total length of the lens unit can be reduced.

FIG. 9 is a cross-sectional view of the hybrid lens 69. As shown in FIG. 9, resin is applied to an optical surface 71 of a lens 70 and then shaped with a mold, so that a resin protrusion 73 is generated on a lens rim 72 around the optical surface of the lens 70. The resin protrusion 73 has a thickness in the direction of the optical axis.

There are problems as described in the following items (1) to (5) in the use of such a hybrid lens 69.

(1) Since the resin protrusion 73 has a thickness in the direction of the optical axis, it is difficult to bring other members or components close to the hybrid lens 69.

(2) Since it is difficult to control the thickness in the direction of the optical axis of the resin protrusion 73, it is necessary to keep long distances from nearby lens groups.

(3) When the resin protrusion 73 is physically removed, dust is generated and affects the optical characteristic of the lens unit.

(4) Other components should be located while avoiding the resin protrusion 73 and should be therefore downsized.

(5) If a small amount of resin is applied and molded so as not to generate a resin protrusion 73, poor molding occurs due to resin un-filling.

SUMMARY OF INVENTION

Technical Problem

It is therefore an object of the present invention to provide a small lens unit which saves space and has an excellent optical characteristic, and also to provide an imaging device using the lens unit.

Solution to Problem

There is provided, according to an aspect of the present invention, a lens unit comprising a first lens, at least part of an optical surface of which is made of resin, said first lens having a resin protrusion made of the resin; a first holding member holding the first lens; a second lens located to the resin side of the first lens and at a distance in a direction of an optical axis from the first lens; and a second holding member holding the second lens, wherein the first lens and the second lens are movable relative to each other; and the second holding member has a recessed portion which at least part of the resin protrusion of the first lens can enter and exit from.

According to the lens unit configured as above, the first lens and the second lens are movable relative to each other so that at least part of the resin protrusion of the first lens can enter and exit from the recessed portion. This makes it possible to easily make the resin protrusion of the first lens overlap with the second holding member in the direction of the optical axis, so that the lens unit is allowed to be shortened as a whole. As a result, portable equipment can be reduced in thickness and increased in convenience. Furthermore, because the first lens and the second lens can be brought close to each other, the flexibility of the optical design increases. Furthermore, it is not necessary to reduce or remove the resin protrusion of the first lens, so that a resin member which conventionally was regarded as defective because of large protrusion can be used. In addition, it becomes possible to increase the amount of resin of the first lens, so that poor molding caused by resin un-filling can be reduced and tolerable production variations of a resin portion can be increased.

Thus, a small lens unit which saves space and has an excellent optical characteristic is realized. The present invention may be applied to a lens unit having a zoom function in which the second lens is capable of moving, a lens unit with a first lens group and a second lens group both of which are fixed, a lens unit with a first lens group and a second lens group both of which are movable for storage, and the like.

In one embodiment, the first lens and the second lens overlap each other in the direction of the optical axis when in a state that the first lens and the second lens are close to each other.

According to this embodiment, the length in the direction of the optical axis can be reduced by making the first lens and the second lens overlap each other in the optical axis direction.

In one embodiment, the resin protrusion of the first lens and the second holding member overlap each other in the direction of the optical axis between the second lens and an outer periphery of the second holding member.

In the embodiment, the resin protrusion of the first lens and the second lens holder overlap each other in the direction of the optical axis between the second lens and the outer periphery of the second lens holder. Therefore, it is possible to make the most of the performance of the second lens without affecting the optical characteristic of the second lens.

In one embodiment, the first holding member holds only an outer periphery of the first lens.

In the embodiment, because the first lens holder holds only the outer periphery of the first lens, it is possible to make the most of the performance of the first lens without affecting the optical characteristic of the first lens. Furthermore, when the first holding member is fixed to a unit, the imaging surface side of the first holding member can be fixed to a subject side surface of a unit. At that time, the thickness of the unit can be increased by reducing the thickness of the first holding member, so that the rigidity of the unit is increased and thereby the deterioration of the optical characteristic caused by pressing force applied to the first lens by a user is reduced. Furthermore, in the fabrication of the imaging device, the adjustment of the position of the first holding member is easily made externally and the optical characteristic of the imaging device can be thereby optimized, so that poor fabrication can be reduced. Furthermore, the unit can be covered with the first holding member, so that the dust-proof effect is increased and the deterioration of the optical characteristic caused by dust entering can be reduced.

In one embodiment, the first holding member is located to a subject side of an imaging surface-side surface of the first lens.

According to the embodiment, the first lens holder is located to the subject side of an imaging surface-side surface of the first lens, so that the outer periphery of the second lens holder can be made thick in the direction of the optical axis by reducing the thickness in the direction of the optical axis of the first lens holder. The rigidity of the second lens holder is increased by making the outer periphery of the second lens holder thick, so that the lens can be prevented from breaking and the second lens holder itself can also be prevented from breaking and bending. As a result, the possible bending of the second lens holder becomes small and the deterioration of the optical characteristic of the lens becomes small.

An imaging device according to the present invention comprises the above-described lens unit.

By including the lens unit that is space-saving and is superior in optical characteristics, a small sized and high-performance imaging device is realized.

Advantageous Effects of Invention

As is apparent from the above, according to the present invention, a small sized and high-performance lens unit is realized.

Also, according to the present invention, by including the lens unit that is space-saving and is superior in optical characteristics, a small sized and high-performance imaging device is realized.

BRIEF DESCRIPTION OF DRAWINGS

FIG. 2A is a cross-sectional view of the lens unit shown in FIG. 1;

FIG. 2B is a cross-sectional view of the lens unit when in a state that its second lens group has been moved from a position shown in FIG. 2A;

DESCRIPTION OF EMBODIMENTS

The lens unit and imaging device according to the present invention will be described in detail below with reference to embodiments shown in the figures.

[First Embodiment]

Figure 1:
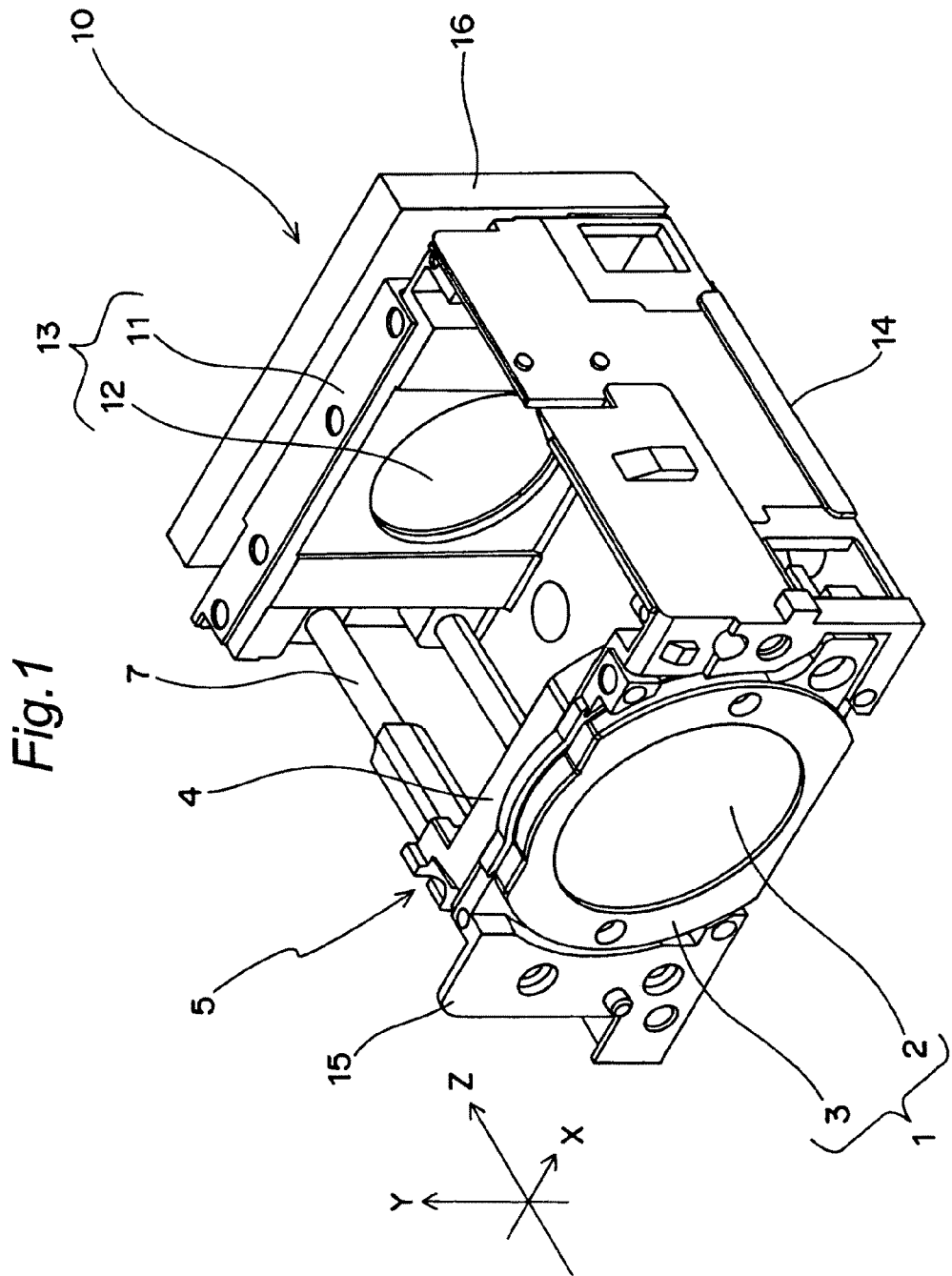
FIG. 1 is a perspective view of a lens unit according to a first embodiment of the present invention.

FIG. 1 is a perspective view of a lens unit according to the first embodiment of the present invention.

Here, the direction of a Z-axis is defined as the direction of an optical axis, while the direction of an X-axis and the direction of a Y-axis are defined as the directions of extension of a plane parallel to an imaging surface. The imaging surface has been set on an imaging element 16. FIG. 2A shows a Z-Y section of the lens unit 10 shown in FIG. 1 seen from the direction of the X-axis.

As shown in FIGS. 1 and 2A, the lens unit 10 has a base 14 shaped like a substantially rectangular plate parallel to the X-Z plane, a first lens group fixing section 15 which is installed at a subject-side end of the base 14 in an upright manner in parallel with the X-Y plane that is substantially normal to a plane of the base 14, and a third lens holder 11 which is installed at an imaging surface-side end of the base 14 in an upright manner in parallel with the X-Y plane substantially normal to the plane of the base 14. The base 14, the first lens group fixing section 15, and the third lens holder 11 are formed into one piece by molding resin.

Furthermore, a first lens group 1 is fixed to the first lens group fixing section 15. The first lens group 1 is composed of a first lens holder 3 as an example of a first holding member and a first lens 2.

Furthermore, located between the first lens group fixing section 15 and the third lens holder 11 is a main guide shaft 7 which is fixed to the first lens group fixing section 15 at one end of the guide shaft and to the third lens holder 11 at the other end thereof. Furthermore, located between the first lens group fixing section 15 and the third lens holder 11 is a second guide shaft (not shown in the figure) which is fixed to the first lens group fixing section 15 at one end of the guide shaft and to the third lens holder 11 at the other end thereof. The second guide shaft is placed in substantially parallel with the main guide shaft 7 and at a predetermined distance from the main guide shaft 7.

Furthermore, a second lens group 5 to be guided in the direction of the optical axis along the main guide shaft 7 and the second guide shaft (not shown) is located between the first lens group fixing section 15 and the third lens holder 11. The second lens group 5 is composed of a second lens 6 and a second lens holder 4 as an example of the second holding member holding the second lens 6. The second lens 6 is located to the imaging surface side of the first lens 2 and at a distance in the direction of the optical axis from the first lens 2.

Furthermore, a third lens 12 is held by the third lens holder 11, and the third lens 12 and the third lens holder 11 constitute a third lens group 13.

And, an imaging element 16 is located outside of the third lens holder 11 in the direction of the Z-axis (optical axis).

Like this, the lens unit 10 has an outer shape of a generally rectangular parallelepiped from which one X-Z plane and one Y-Z plane are excluded, and its planes except the X-Z plane and the Y-Z plane are vertically or substantially vertically connected with each other. Furthermore, the first lens group 1, the second lens group 5, and the third lens group 13 are located in this order along the direction of the Z-axis (the optical axis) from the subject side to the imaging element 16 side.

The second lens holder 4 has a through hole 21 (shown in FIG. 4), and the main guide shaft 7 running parallel to the direction of the Z-axis (optical axis) passes through the through hole 21. Furthermore, the direction of rotation of the second lens holder 4 is restricted to an X-Y plane by the second guide shaft (not shown). Thus, the second lens holder 4 is movable in the direction of Z-axis along the main guide shaft 7.

FIG. 2B shows the state that the second lens group 5 has been moved toward the subject side in the direction of the Z-axis (optical axis). Like this, the second lens group 5 is movable from the imaging surface side to the subject side and from the subject side to the imaging surface side. In the first embodiment, a moving means for moving the second lens group 5 is not described.

Figure 3:
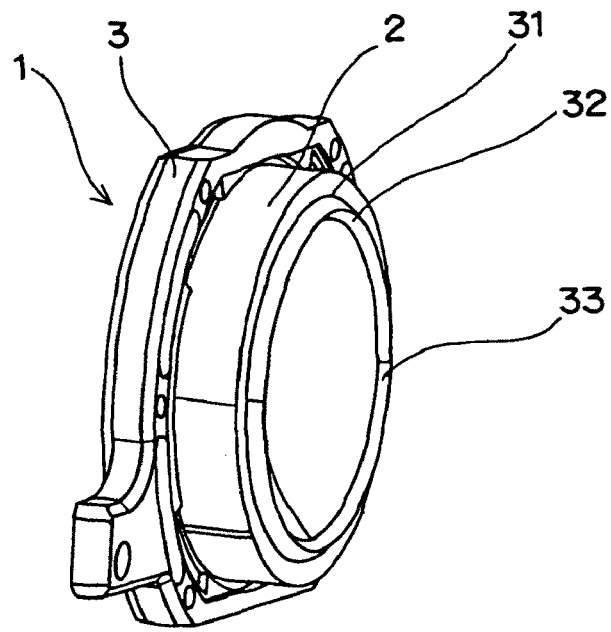
FIG. 3 is a perspective view of a first lens group.

FIG. 3 is a perspective view of the first lens group 1 seen from the imaging surface side. The imaging surface side of the first lens 2 of the first lens group 1 is formed into a concave lens. Furthermore, the first lens 2 is a hybrid lens with a resin lens surface made of resin 32 formed on the imaging surface-side lens surface. Resin other than an amount of resin necessary for forming the resin lens surface protrudes to a lens rim 31 around the resin lens surface of the first lens 2 to form a circular resin protrusion 33. The resin protrusion 33 projects from the lens rim 31 in the direction of the Z-axis (optical axis) toward the imaging surface. The first lens may be one in which part of the imaging surface side optical surface is made of resin.

In order that the resin protrusion 33 has little thickness in the direction of the optical axis, the lens diameter should be large so that unnecessary resin accumulates outside the effective diameter of the lens. However, the lens diameter of a lens unit installed in small portable equipment cannot be made large. Furthermore, although the resin protrusion 33 can be physically removed after forming the resin lens surface, dust is generated by removing the resin protrusion 33. This would cause the shadow of the dust to appear in a captured image. Also, the dust may be caught in a sliding portion of a driving section for driving the second lens holder 4 to thereby cause a drive failure. Thus, the resin protrusion 33 is maintained as it is, as shown in FIG. 3.

The first lens holder 3 has a through hole of about the same diameter as the first lens 2. The first lens holder 3 has two surfaces parallel to the X-Y plane. The first lens holder 3 holds a subject-side part of the outer periphery of the first lens 2. Specifically, the first lens holder 3 holds a portion (i.e., a subject side portion) of about half of the thickness in the direction of the optical axis of the first lens 2. Thus, the imaging surface side—part of the outer periphery of the first lens 2 is not in contact with the first lens holder 3. Furthermore, an imaging surface-side X-Y surface or plane of the first-lens holder 3 is fixed to a subject-side X-Y surface or plane of the first lens group fixing section 15.

Thus, alignment between the first lens group fixing section 15 and the first lens 2 of the lens unit 10 is achieved through the first lens holder 3. Furthermore, the first lens holder 3 and the first lens group fixing section 15 are brought into contact with each other on the X-Y plane, so that the positioning of the first lens can be performed freely in the X-Y plane which is normal to the optical axis. The first lens holder 3 is on the subject side of the first lens group fixing section 15, and can be therefore easily positioned with respect to the first lens group fixing section 15 using an external jig.

Figure 4:
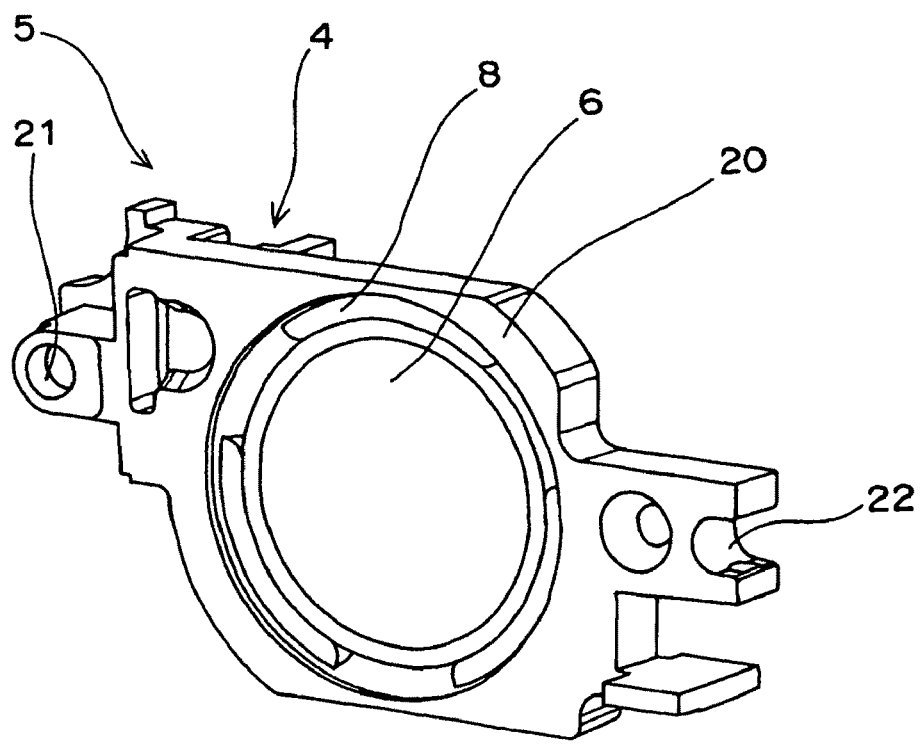
FIG. 4 is a perspective view of the second lens group.

FIG. 4 is a perspective view of the second lens group 5 seen from the subject side. As shown in FIG. 4, the second lens holder 4 has a through hole 21 parallel to the optical axis where the main guide shaft 7 passes through. Furthermore, the second lens holder 4 has a groove 22 where the second guide shaft (not shown) for preventing the second lens holder 4 from rotating on an X-Y plane passes through. The second lens holder 4 has a second lens holder recess 8 as an example of the recessed portion. The second lens holder recess 8 is located to the imaging surface side in the direction of the Z-axis (optical axis) of the second lens holder surface 20 which is a subject-side X-Y plane of the second lens holder 4. The second lens holder recess 8 is formed concentrically with and around the second lens 6, and the depth of the second lens holder recess 8 corresponds to a distance from a surface of the lens rim of the second lens 6 to the second lens holder surface 20. Furthermore, the diameter of the second lens holder recess 8 is smaller than the diameter of the first lens 2, and larger than the outer diameter of a circular area of the lens rim surface on which area the resin protrusion 33 of the first lens 2 is formed.

Figure 5:
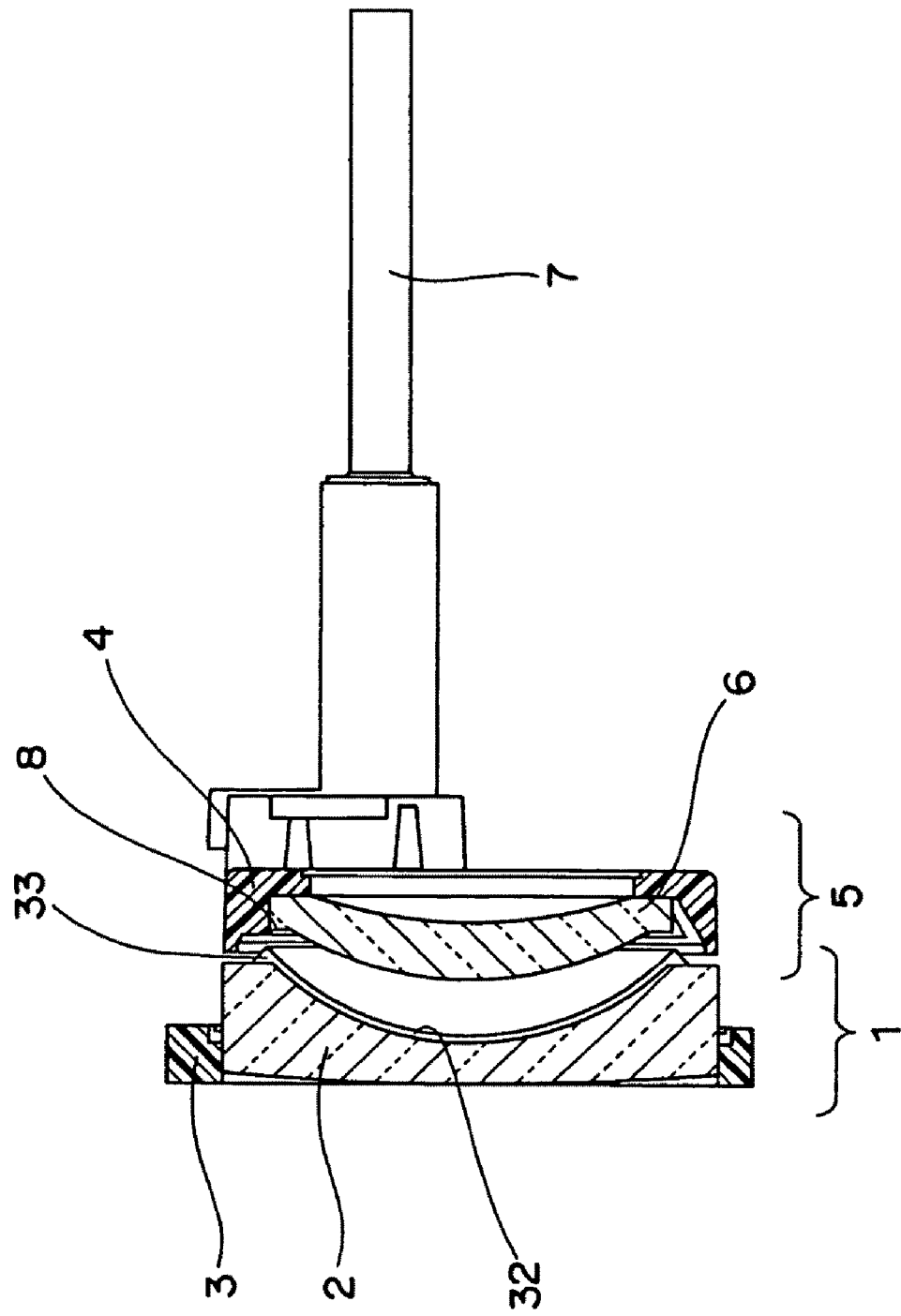
FIG. 5 shows a state that the first lens group and the second lens group are closest to each other.

FIG. 5 shows a state that the first lens group 1 and the second lens group 5 are the closest to each other. As shown in FIG. 5, the resin protrusion 33 of the first lens 2 has entered the second holder recess 8 of the second lens holder 4, and overlaps the second lens holder 4 in the direction of the Z-axis (optical axis). Thus, the thickness in the direction of the Z-axis of the second lens holder 4 can be increased to the extent that it does not come into contact with the first lens 2. Furthermore, the resin protrusion 33 can be formed without contact with any other components.

Like this, in the lens unit 10 configured as above, contact between the resin protrusion 33 and the second lens holder 4 is avoided, and generation of resin dust caused by the contact is prevented. Furthermore, the distance between the hybrid lens (first lens 2) and the movable lens (second lens 6) can be reduced, thereby increasing the flexibility of the lens design and improving the convenience. Furthermore, it is possible to enlarge the resin protrusion 33 of the first lens 2 which is a hybrid lens, so that the amount of resin applied to the lens surface when molding resin can be increased, and poor molding caused by resin un-filling or insufficient filling can be reduced.

Thus, a small-sized lens unit which saves space and has an excellent optical characteristic can be realized.

Furthermore, the resin protrusion 33 of the first lens 2 enters the second lens holder recess 8 as the recessed portion provided on the second lens holder 4 in the state that the first lens 2 and the second lens 6 are close to each other, so that the resin protrusion 33 of the first lens 2 and the second lens holder 4 can be easily made to overlap each other in the direction of the optical axis.

Furthermore, the length of the lens unit can be reduced by making the second lens 6 and the first lens 2 overlap each other in the direction of the optical axis.

Furthermore, the resin protrusion 33 of the first lens 2 and the second lens holder 4 overlap each other in the direction of the optical axis between the second lens 6 and the outer periphery of the second lens holder 4, so that it is possible to make the most of the performance of the second lens 6 without affecting the optical characteristic of the second lens 6.

Furthermore, the first lens holder 3 holds only the outer periphery of the first lens 2, so that it is possible to make the most of the performance of the first lens 2 without affecting the optical characteristic of the first lens 2.

Furthermore, the first lens holder 3 is located to the subject side of an imaging surface-side surface of the first lens 2, so that the outer periphery of the second lens holder 4 can be made thick in the direction of the optical axis by reducing the thickness in the direction of the optical axis of the first lens holder 3. The rigidity of the second lens holder 4 is increased by making the outer periphery of the second lens holder 4 thick, so that the lens can be prevented from breaking and the second lens holder 4 itself can also be prevented from breaking and bending. As a result, the possible bending of the second lens holder 4 becomes small and the deterioration of the optical characteristic of the lens becomes small.

In addition, a small sized and high-performance imaging device can be realized by using the lens unit 10.

Furthermore, in the first embodiment, the second lens group 5 is movable to conduct a continuous zoom operation in a small space. Furthermore, the second lens group 5 approaching the first lens group 1 allows the fabrication error of lens groups other than the second lens group 5 to be accommodated.

[Second Embodiment]

Figure 6:
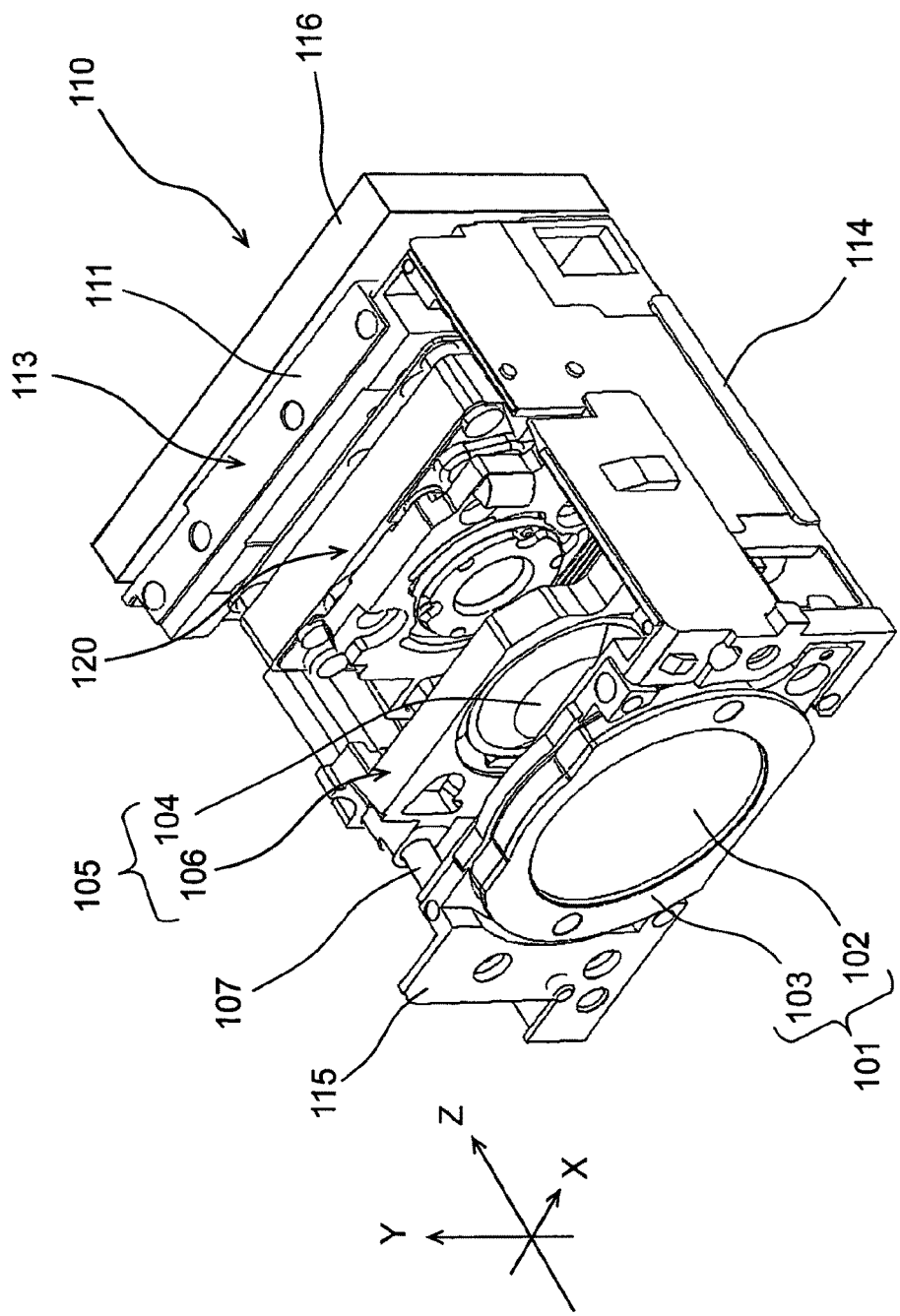
FIG. 6 is a perspective view of a lens unit according to a second embodiment of the present invention.
Figure 7A:
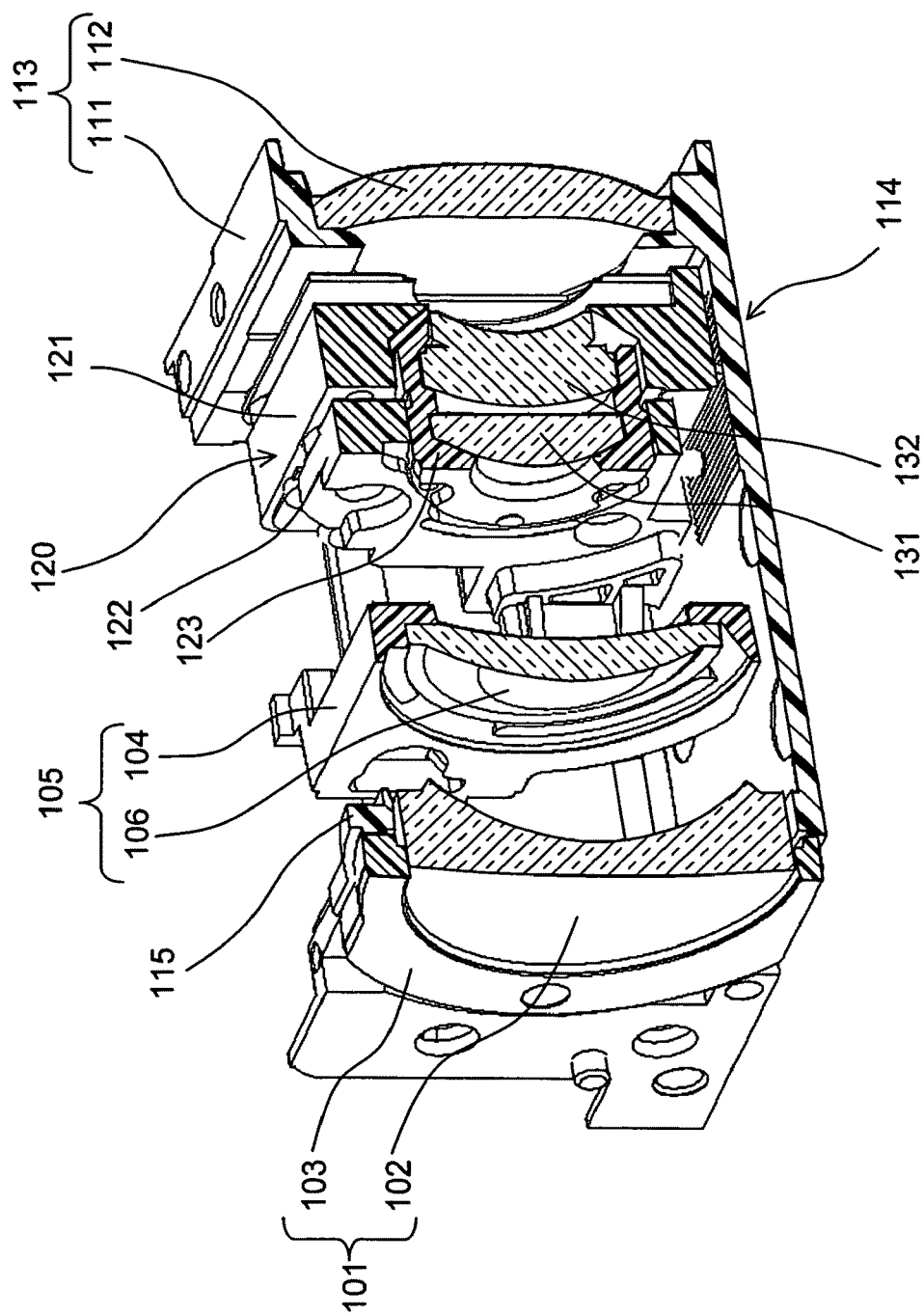
FIG. 7A is a cross-sectional view of the lens unit shown in FIG. 6.

FIG. 6 is a perspective view of a lens unit according to the second embodiment of the present invention. The lens unit of this embodiment is the same in configuration as the lens unit of the first embodiment, except for a third lent unit 120. Here, the direction of a Z-axis is defined as the direction of an optical axis, while the direction of an X-axis and the direction of a Y-axis are defined as the directions of extension of a plane parallel to an imaging surface. The imaging surface has been set on an imaging element 116. FIG. 7A shows a Z-Y section of the lens unit 110 shown in FIG. 6 seen from the direction of the X-axis.

As shown in FIGS. 6 and 7A, the lens unit 10 has a base 114 shaped like a substantially rectangular plate parallel to the X-Z plane, a first lens group fixing section 115 which is installed at a subject-side end of the base 114 in an upright manner in parallel with the X-Y plane that is substantially normal to a plane of the base 114, and a fourth lens holder 111 which is installed at an imaging surface-side end of the base 114 in an upright manner in parallel with the X-Y plane substantially normal to the plane of the base 114. The base 114, the first lens group fixing section 115, and the fourth lens holder 111 are formed into one piece by molding resin.

Furthermore, a first lens group 101 is fixed to the first lens group fixing section 115. The first lens group 101 is composed of a first lens holder 103 as an example of a first holding member and a first lens 102.

Furthermore, located between the first lens group fixing section 115 and the fourth lens holder 111 is a main guide shaft 107 which is fixed to the first lens group fixing section 115 at one end of the guide shaft and to the fourth lens holder 111 at the other end thereof. Furthermore, located between the first lens group fixing section 115 and the fourth lens holder 111 is a second guide shaft (not shown in the figure) which is fixed to the first lens group fixing section 115 at one end of the second guide shaft and to the fourth lens holder 111 at the other end thereof. The second guide shaft is placed in substantially parallel with the main guide shaft 107 and at a predetermined distance from the main guide shaft 107.

Furthermore, a second lens group 105 and a third lens group 120 to be guided in the direction of the optical axis along the main guide shaft 107 and the second guide shaft (not shown) are located next to the first lens group 101 in this order between the first lens group fixing section 115 and the fourth lens holder 111.

The second lens group 105 is composed of a second lens 106 and a second lens holder 104 as an example of the second holding member holding the second lens 106. The second lens 106 is located to the imaging surface side of the first lens 102 and at a distance in the direction of the optical axis from the first lens 102.

The third lens group 120 is composed of lenses 131 and 132 (which are arranged in this order from the first lens group 101-side), lens holders 123 and 124 holding the associated lenses 131 and 132, and a shutter 121 mounted to a lens holder 122.

Furthermore, a third lens 112 is held by the fourth lens holder 111, and the third lens 112 and the fourth lens holder 111 constitute a fourth lens group 113.

And, an imaging element 116 is located outside of the fourth lens holder 111 in the direction of the Z-axis (optical axis).

Like this, the lens unit 110 has an outer shape of a generally rectangular parallelepiped from which one X-Z plane and one Y-Z plane are excluded, and its planes except the X-Z plane and the Y-Z plane are vertically or substantially vertically connected with each other. Furthermore, the first lens group 101, the second lens group 105, the third lens group 120, and the fourth lens group 113 are located in this order along the direction of the Z-axis (the optical axis) from the subject side to the imaging element 116 side.

The second lens holder 104 has a through hole, and the main guide shaft 107 running parallel to the direction of the Z-axis (optical axis) passes through the through hole. Furthermore, the direction of rotation of the second lens holder 104 is restricted to an X-Y plane due to the second guide shaft (not shown). Thus, the second lens holder 104 is movable in the direction of the Z-axis along the main guide shaft 107.

The lens holder 122 in the third lens group 120 has a through hole, and the main guide shaft 107 running parallel to the direction of the Z-axis (optical axis) passes through the through hole. Furthermore, the direction of rotation of the lens holder 122 is restricted to an X-Y plane due to the second guide shaft (not shown). Thus, the lens holder 122 is movable in the direction of the Z-axis along the main guide shaft 107.

Figure 7B:
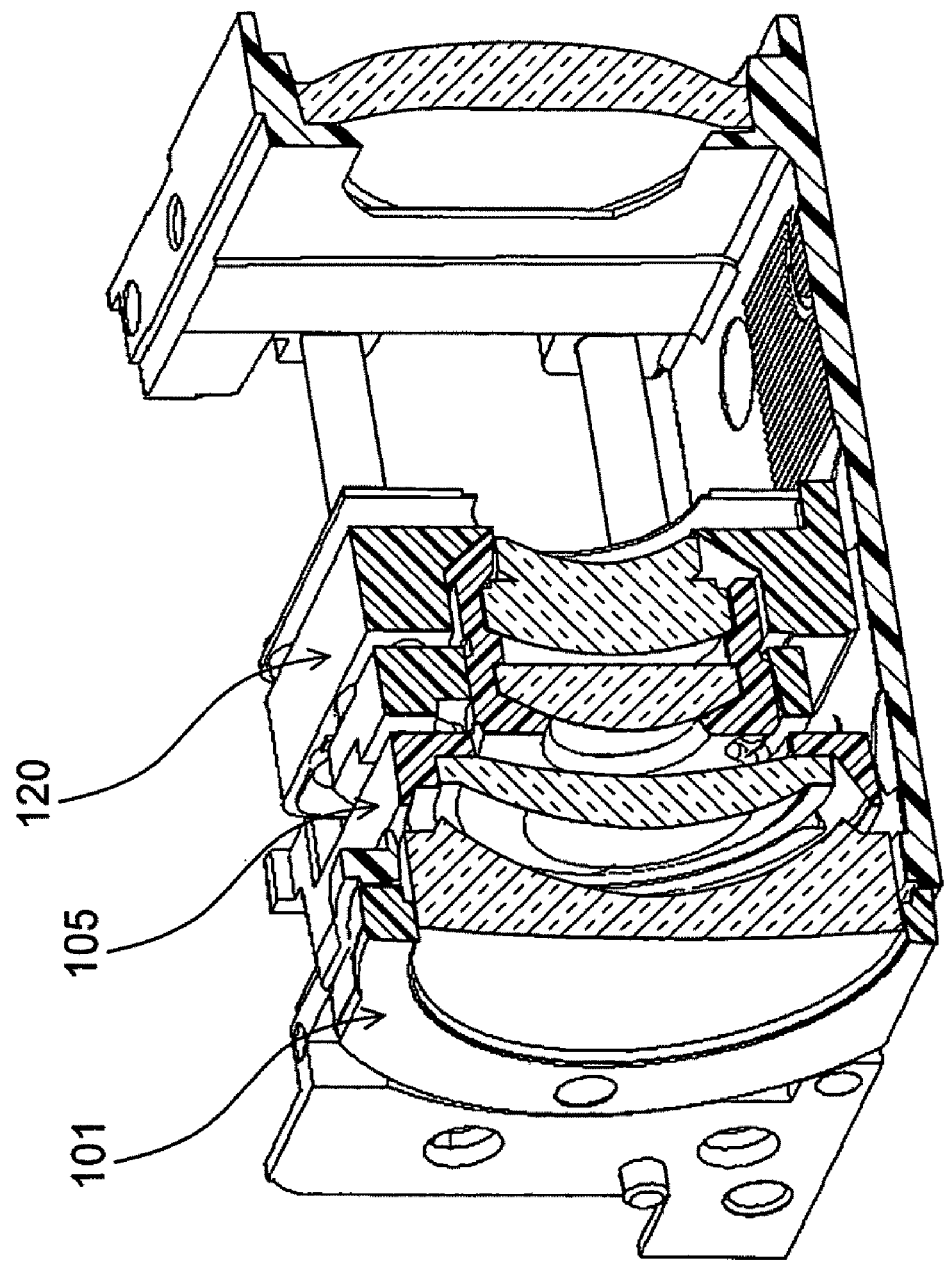
FIG. 7B is a cross-sectional view of the lens unit when in a state that its second lens group and third lens group have been moved from their positions shown in FIG. 7A.
Figure 8:
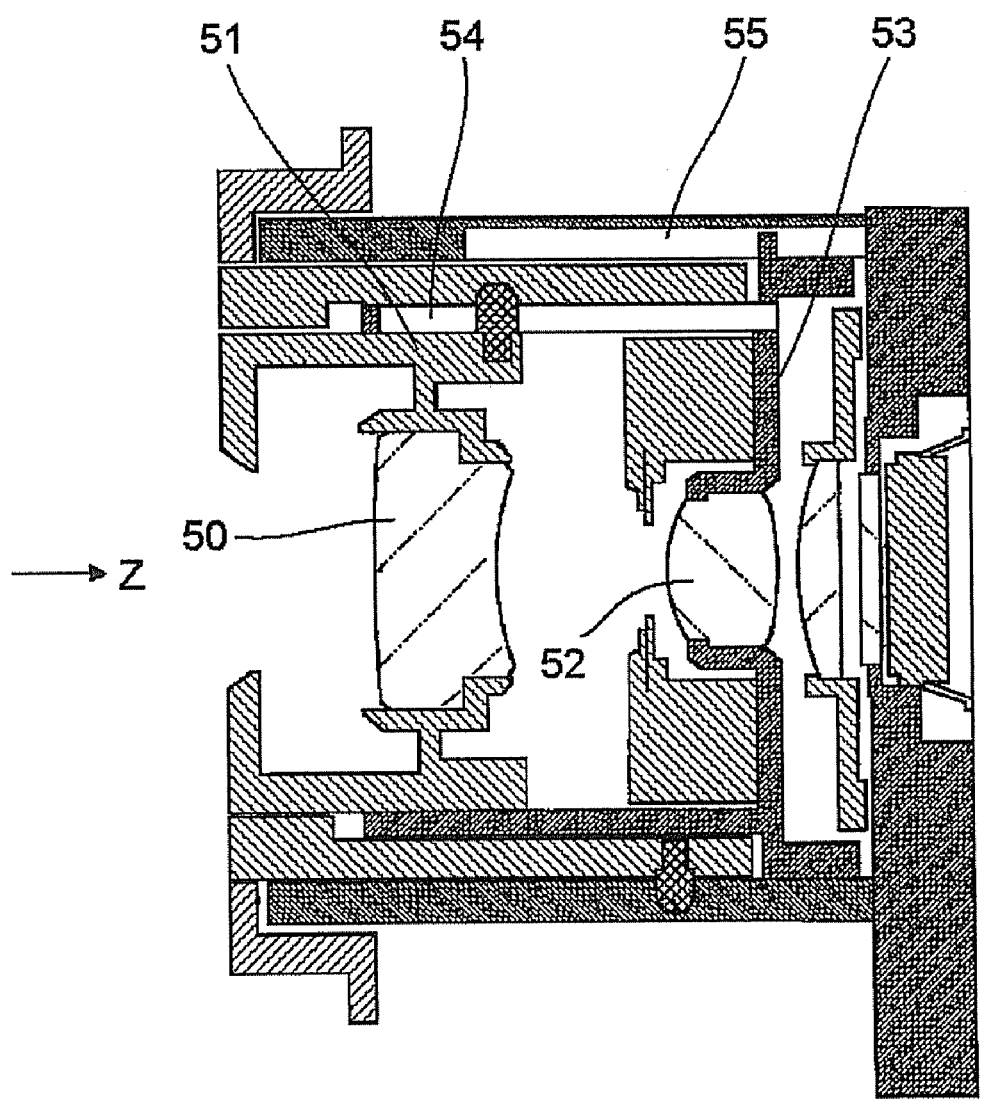
FIG. 8 is a perspective view of a conventional zoom lens unit.
Figure 9:
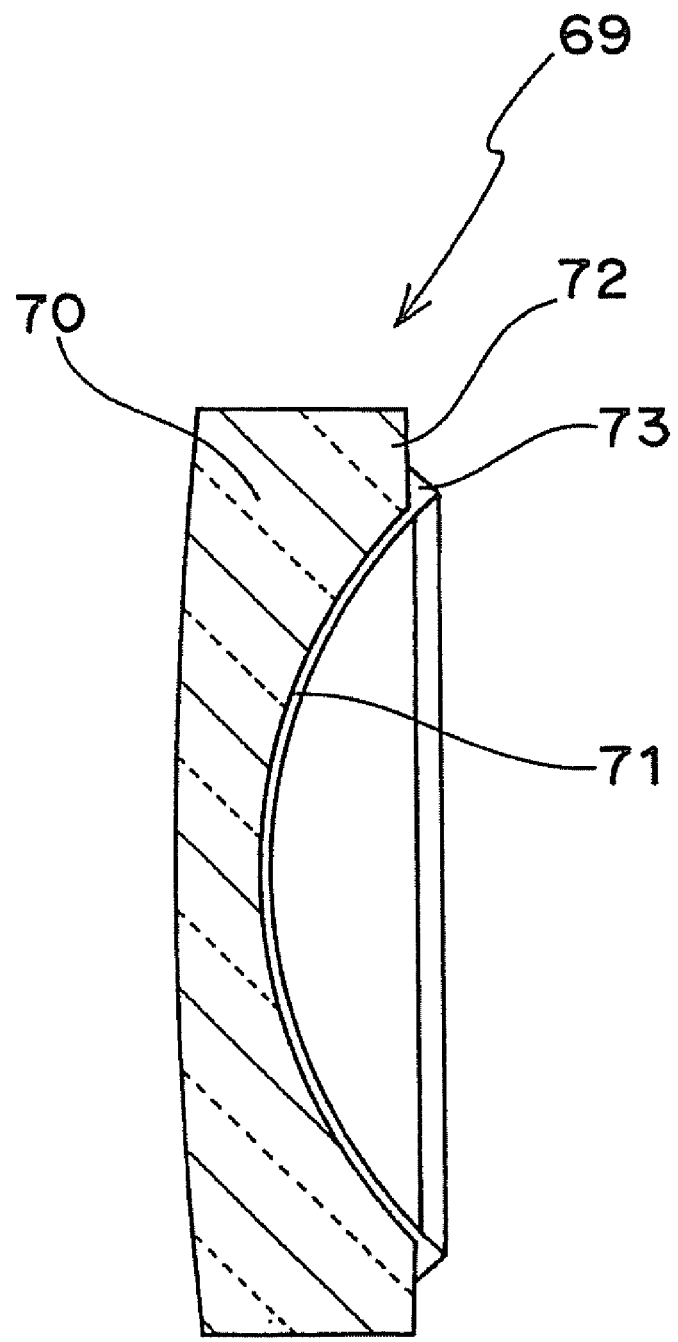
FIG. 9 is a cross-sectional view of a conventional hybrid lens.

FIG. 7B shows the state that the second lens group 105 and the third lens group 120 have been moved toward the subject side in the direction of the Z-axis (optical axis). Like this, the second lens group 105 and the third lens group 120 are movable from the imaging surface side to the subject side and from the subject side to the imaging surface side. In the second embodiment, moving means for moving the second lens group 105 and the third lens group 120 are not described.

The lens unit of the second embodiment has an effect similar to that of the lens unit of the first embodiment.

Furthermore, in the second embodiment, the second lens group 105 and the third lens group 120 are movable to conduct a continuous zoom operation in a small space. Furthermore, the second lens group 105 approaching the first lens group 101 allows the fabrication error of lens groups other than the second lens group 105 to be accommodated.

The lens unit of the present invention is not limited to the first embodiment and the second embodiment, and various modifications can be made hereto. It should be understood that embodiments obtained by combining technical means disclosed in the first and second embodiments as necessary are also included in the scope of the present invention.

The first embodiment describes the lens unit 10 having a zoom function in which the second lens group 5 is movable. However, the present invention is not limited to a lens unit having a zoom function, but may be applied to a lens unit in which both of the first and second lens groups are fixed, a lens unit in which both of the first and second lens groups are movable for retraction, and the like (the same can be said of the second embodiment).

Furthermore, in the first and second embodiments, the second lens group and the third lens group 120 can be moved and a continuous zoom operation can be conducted in a small space.

A lens unit according to the present invention may include a first lens having an imaging plane-side optical surface, at least part of which is made of resin; a first holding member holding the first lens; a second lens located to the resin side of the first lens and at a distance in a direction of an optical axis from the first lens; and a second holding member holding the second lens, wherein a resin protrusion of the first lens and the second holding member overlap each other in the direction of the optical axis when in a state that the first lens and the second lens are close to each other.

According to the lens unit configured as above, the resin protrusion of the first lens overlaps the second holding member, so that the whole of the lens unit can be shortened. As a result, portable equipment can be reduced in thickness and increased in convenience. Furthermore, the first lens and the second lens can be brought close to each other, so that the flexibility of the optical design increases. Furthermore, it is not necessary to reduce or remove the resin protrusion of the first lens, so that a resin member which conventionally was regarded as defective because of large protrusion can be used. In addition, it becomes possible to increase the amount of resin of the first lens, so that poor molding caused by resin un-filling can be reduced and tolerable production variations of a resin portion can be increased.

Thus, a small lens unit which saves space and has an excellent optical characteristic can be realized. Furthermore, the present invention may be applied to a lens unit having a zoom function capable of moving a second lens, a lens unit with a first lens group and a second lens group which are fixed, a lens unit with a first lens group and a second lens group both of which are movable for storage, and the like.

Furthermore, the second holding member may be provided with a recessed portion to receive the resin protrusion of the first lens when the first lens and the second lens are close to each other. In this case, with the resin protrusion being in the recessed portion, the resin protrusion of the first lens and the second holding member can be easily made overlap each other in the direction of the optical axis.

The invention claimed is:

1. A lens unit comprising:
   a first lens, at least part of an optical surface of which is made of resin, said first lens having a resin protrusion;
   a first holding member holding the first lens;
   a second lens located to the resin side of the first lens and at a distance in a direction of an optical axis from the first lens; and
   a second holding member holding the second lens,
   wherein
   the first lens and the second lens are movable relative to each other;
   the second holding member has a recessed portion which at least part of the resin protrusion of the first lens can enter and exit from;
   the first lens and the second lens overlap each other in the direction of the optical axis when in a state that the first lens and the second lens are close to each other;
   the resin protrusion of the first lens and the second holding member overlap each other in the direction of the optical axis between the second lens and an outer periphery of the second holding member;
   the first holding member holds only part of an outer periphery of the first lens;
   the first holding member has an image surface-side end surface normal to a direction of an optical axis, the imaging surface-side end surface of the first holding member being located to a subject side of an imaging surface-side surface of the first lens; and
   a base supporting the first and second holding members is provided with a fixing section having a subject-side surface normal to the direction of the optical axis, and the imaging surface-side end surface of the first holding member and the subject-side surface of the fixing section are in contact with each other on a plane normal to the direction of the optical axis such that the first lens is fixed relative to the base in such a manner that positioning of the first lens is freely performable in said plane.

2. An imaging device comprising the lens unit as claimed in claim 1.

* * * * *